United States Patent
Butz et al.

[19]

[11] Patent Number: 6,039,779

[45] Date of Patent: Mar. 21, 2000

[54] FILTER ELEMENT

[75] Inventors: Thomas Butz, Korntal-Muenchingen; Ralf Kaller, Kornwestheim; Guenther Kissel, Stuttgart; Gehard Mayer, Pleidelsheim; Volker Koch, Stuttgart; Werner Schnabel, Revenstein, all of Germany

[73] Assignee: Filterwerk Mann & Hummel GmbH, Ludwigsburg, Germany

[21] Appl. No.: 09/029,983

[22] PCT Filed: Jul. 23, 1996

[86] PCT No.: PCT/EP96/03239

§ 371 Date: May 7, 1998

§ 102(e) Date: May 7, 1998

[87] PCT Pub. No.: WO97/10039

PCT Pub. Date: Mar. 20, 1997

[30] Foreign Application Priority Data

Sep. 15, 1995 [DE] Germany .......................... 195 34 254

[51] Int. Cl.⁷ .................................................. B01D 46/52
[52] U.S. Cl. ................................ 55/499; 55/501; 55/514; 55/524; 55/DIG. 31
[58] Field of Search .............................. 55/499, 500, 501, 55/521, DIG. 31, 514, 524; 210/493.5, 497.2

[56] References Cited

U.S. PATENT DOCUMENTS

| | | | |
|---|---|---|---|
| 3,158,458 | 11/1964 | Babbitt ....................... | 55/499 |
| 4,363,643 | 12/1982 | Elbrader et al. ............ | 55/499 |
| 4,707,167 | 11/1987 | Saito et al. ................. | 55/499 |
| 5,043,000 | 8/1991 | Kadoya ....................... | 55/499 |

*Primary Examiner*—David A. Simmons
*Assistant Examiner*—Minh-Chau T. Pham
*Attorney, Agent, or Firm*—Evenson, McKeown, Edwards & Lenahan, P.L.L.C.

[57] ABSTRACT

A filter element, in particular for purifying the intake air of an internal combustion engine, constituted by a non-woven fabric or paper folded in the manner of a concertina and secured as a flat plate in a frame (10). In order to increase the stability of this filter medium (11), strut segments (19, 20) are disposed on the frame, which engage in folds in the plate and are bonded thereto.

7 Claims, 2 Drawing Sheets

FILTER ELEMENT

BACKGROUND OF THE INVENTION

A filter element is proposed comprising a pleated filter element of paper or non-woven fabric in the form of a plate fixed in a frame. German Patent 40 02 078 discloses a filter element. This consists of a nonwoven fabric material folded in zig-zag form which is provided with frame elements, the frame elements being produced in part by thermoplastic welding of the nonwoven fabric. Such a filter element is used, for example, in automobile manufacture. A disadvantage of this filter element is to be seen in the fact that it shows a certain instability. Especially in the event of pressure surges there is the danger that the pleats may buckle or collapse. The filtering action is thus considerably reduced, and the filter's resistance to flow is greatly increased.

To avoid these disadvantages, it is known from U.S. Pat. No. 2,058,669 to provide a filter element folded in zig-zag form with a supporting comb. This supporting comb is adapted to improve the stability of the folds considerably. However, a disadvantage of the supporting comb is to be seen in the fact that the effective filter surface is very greatly reduced.

The invention is addressed to the problem of providing a filter element which avoids the aforementioned disadvantages, exhibits great stability, and at the same time produces only an insignificant increase in the resistance to flow. Moreover, the filter element should be simple to dispose of.

SUMMARY OF THE INVENTION

This problem is solved by the present invention.

The significant advantage of the invention is that the support of the filter material is partial, i.e., the filter material is supported in those areas in which increased flexure can occur. Thus the effective filter surface area is reduced only to a very limited degree or not at all. The support is advantageously provided on the raw air side, i.e., the projecting segment engages the raw air pleat, supports the plate in the direction of flow, and at the same time varies any buckling of the folds.

According to one embodiment of the invention the projecting segment is adhesively bonded to the filter medium. This increases the stability.

A further embodiment of the invention envisions providing the projecting segment with an aperture. This aperture forms pockets which can be filled with adhesive material or glue. This embodiment achieves an additional increase in the stability, i.e. a reliable attachment of the filter element.

Especially when the filter is used in the air intake of an internal combustion engine, pulsations may occur which are caused by the motor. This pulsation may cause a vibration of the filter element. The device of the invention effectively forestalls the effect of the pulsation on the filter element.

To secure the flat plate to the frame, in an additional embodiment of the invention a polyurethane foam gasket is arranged along the frame. It is poured in the uncured state into a gasket chamber of the frame. As it hardens it flows slightly into the pleat pockets of the filter element and thus produces the sealing and the connection between the frame and the plate. Instead of a polyurethane foam, a silicone foam or other similar resilient material can be used.

Handling is facilitated in another embodiment of the invention by removal tabs. These are arranged on the frame and can be turned up for removal of the filter element from a housing.

These and additional features of preferred embodiments of the invention will be found in the description and drawings as well as in the claims, and the individual features can be realized individually or together in the form of subcombinations in the embodiment of the invention and in other fields, and may represent advantageous as well as independently patentable embodiments for which protection is hereby claimed.

BRIEF DESCRIPTION OF THE DRAWINGS

The invention is further explained below with reference to an illustrative embodiment.

DETAILED DESCRIPTION OF THE DRAWINGS

Figure 1:
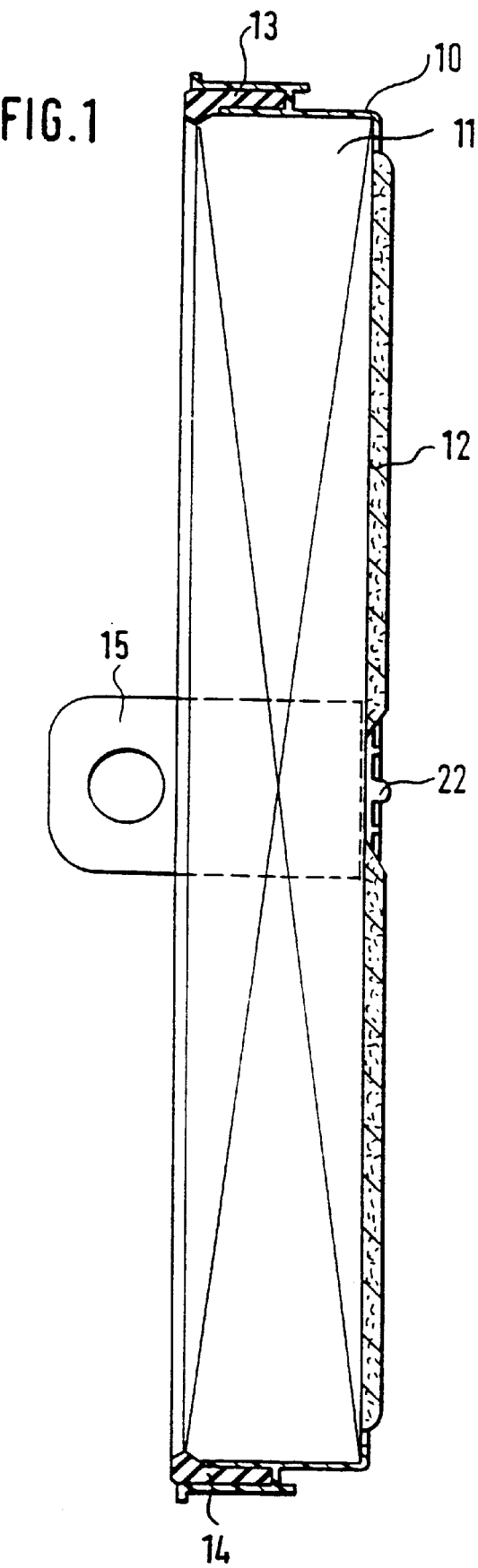
FIG. 1 shows a filter element in sectional view.

The filter element of FIG. 1 comprises a frame 10, which is made of thermoplastic synthetic resin material, for example. In this frame a filter medium 11 folded in zig-zag form is disposed. On the raw air entry side there is a preliminary filter web 12 which effectively holds back coarse dirt and provides for uniform distribution of the air. The frame has seal pockets 13 extending around its margin. A silicone foam seal is cast in these seal pockets. As can be seen in the figure, the silicone foam extends also into the filter medium area and thus produces a circumferential fixation of the filter medium. On the frame 10 there are one or more removal tabs 15.

Figure 2:
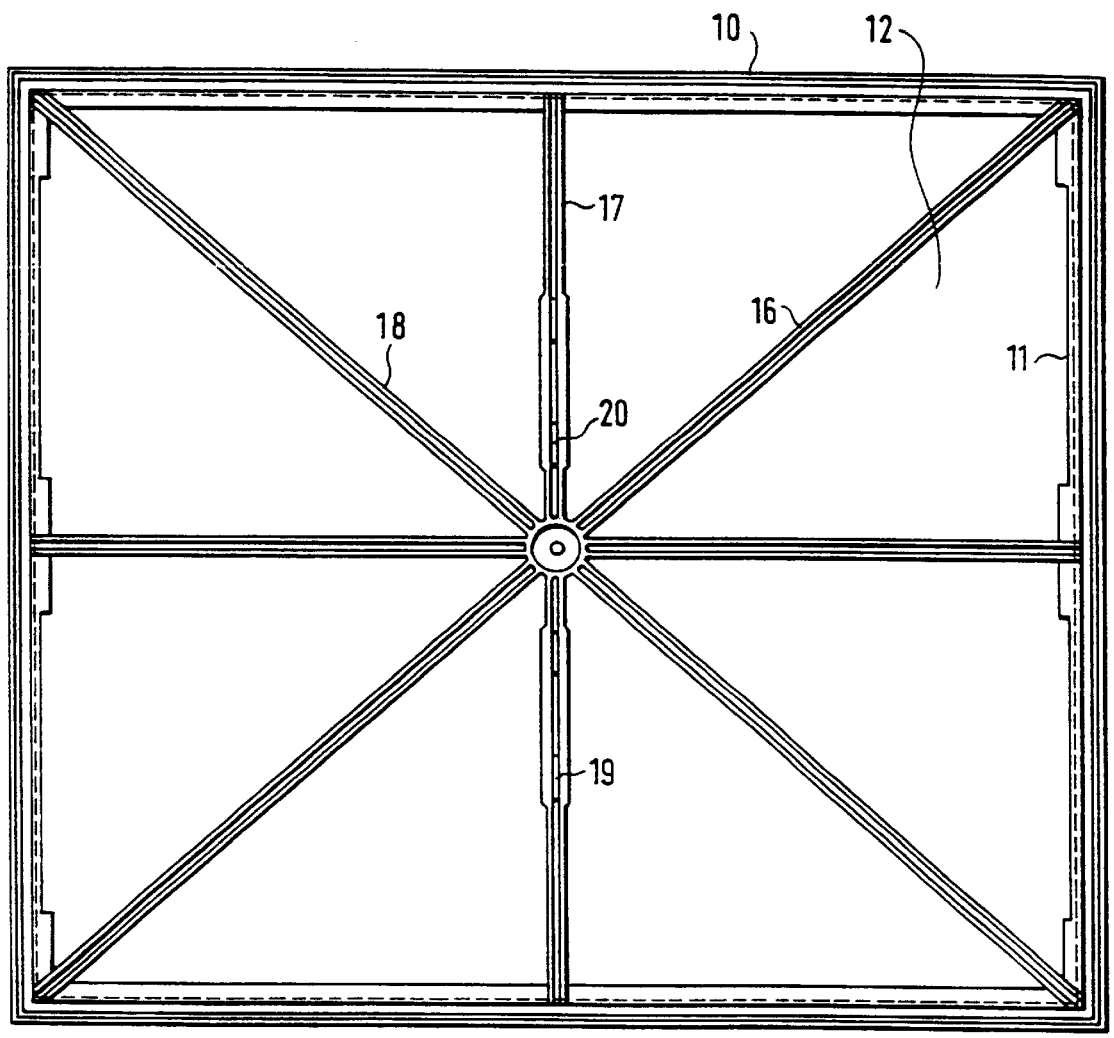
FIG. 2 shows a filter element in plan view.

The plan view according to FIG. 2 shows the frame 10 with the filter medium inserted. The frame is stabilized by rods 16, 17 and 18. These rods are joined to each other in the center. This junction is simultaneously the point of injection during production of the thermoplastic injection molded part. The junction 22 provides additional stabilization of the filter medium in its central area. The rod 17 furthermore has two projecting segments 19 and 20 which are shown greater detail in FIG. 3.

The preliminary filter mat 12, which lies on the side visible in FIG. 2, contains slots in the projecting segment areas which permit the segments to pass through them.

Figure 3:
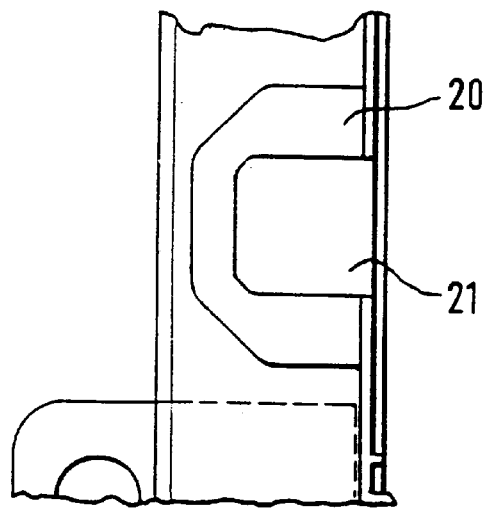
FIG. 3 shows a detail view of the filter element with a projecting segment.

The projecting segment 20, shown in enlarged view in FIG. 3, has a hollow space 21. The projecting segment engages in a pocket of the filter medium and thus lies with both its surfaces in contact with the filter medium. The hollow space 21 can be filled with an adhesive material. This adhesive material bonds with the two surfaces of the adjacent filter medium and constitutes a reliable bond between the filter medium and the projecting segment.

The sealing material, i.e., the silicone foam gasket, which is cast in the gasket pocket, does not bond to the frame 10. Thus it is possible to remove the used filter element with the gasket from the frame and to dispose of it separately. Likewise, since the preliminary filter mat web is merely laid into the frame, it can be released from the frame after the filter medium is removed.

We claim:

1. A filter element comprising a pleated filter medium in the form of a flat plate secured in a surrounding frame, a plurality of support rods extending across the frame over a surface of the plate, at least one rod having at least one projecting segment extending into a fold of the pleated filter medium so that sides of the projecting segment abut the filter medium, and said projecting segment having at least one aperture therethrough which is filled with an adhesive to adhesively bond the projecting segment to said filter medium, whereby said filter medium is stabilized against vibrating, bucking or collapsing.

2. A filter element according to claim 1, wherein said filter material is made of paper or a nonwoven fabric.

3. A filter element according to claim 1, further comprising a preliminary filter web arranged over the surface of the pleated filter material plate.

4. A filter element according to claim 1, wherein the filter medium is secured to the surrounding frame by a resilient seal received in a seal pocket in the surrounding frame and extending into the filter medium.

5. A filter element according to claim 4, wherein said resilient seal comprises silicone foam.

6. A filter element according to claim 1, further comprising at least one removal tab arranged on the filter medium for facilitating removal of the filter medium from the surrounding frame.

7. A filter element according to claim 1, wherein said support rods and projecting element are arranged on the upstream, unfiltered air side of the filter element.

* * * * *